Feb. 25, 1964 R. BLICKENSDERFER 3,122,224
METALLIC STRUCTURAL ELEMENT
Filed March 30, 1961
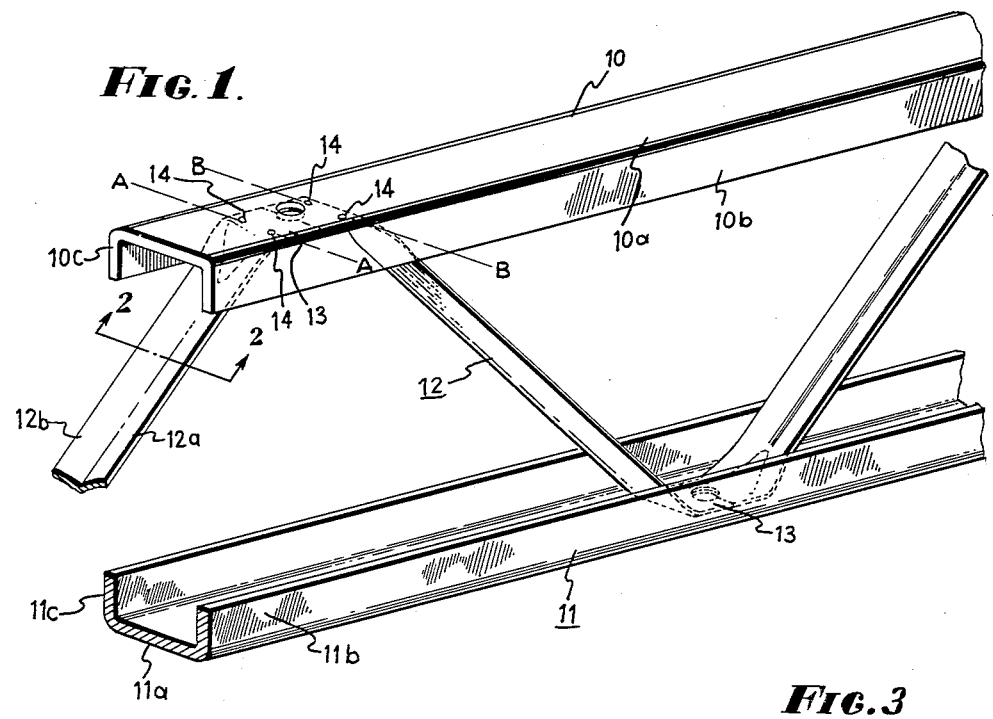
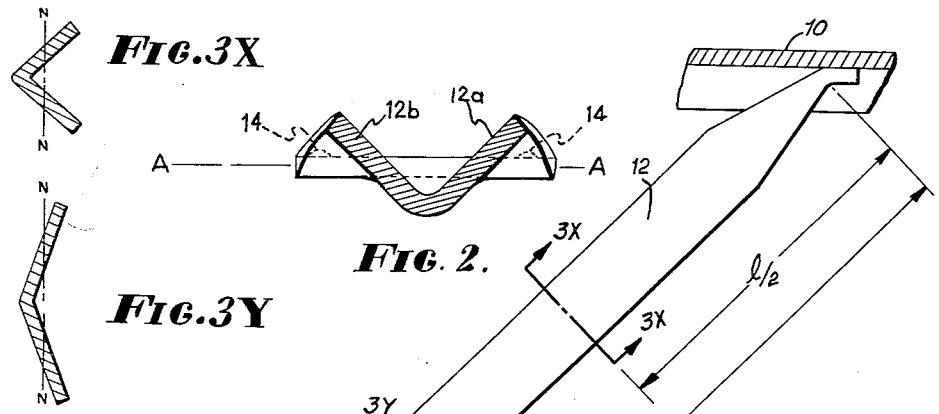
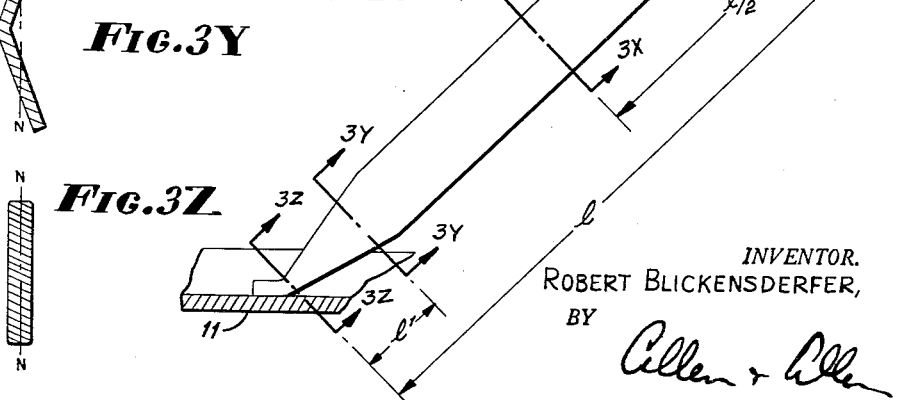
INVENTOR.
ROBERT BLICKENSDERFER,
BY
ATTORNEYS.

United States Patent Office 3,122,224
Patented Feb. 25, 1964

3,122,224
METALLIC STRUCTURAL ELEMENT
Robert Blickensderfer, Foster, Ohio, assignor to Armco Steel Corporation, Middletown, Ohio, a corporation of Ohio
Filed Mar. 30, 1961, Ser. No. 99,545
4 Claims. (Cl. 189—37)

This invention relates to a metallic structural element of the general nature of what is known in the industry as a bar-joist. Bar-joists are used in a great variety of situations where a structural member is required to be strong and yet light. In such situations, it is used in place of such structural members as I-beams, H-beams and box type beams.

The usual type of bar-joist comprises a pair of longitudinal members in spaced parallel relation connected together by a rod bent in zig zag arrangement and welded alternately to one or the other of the parallel members. Such bar-joists are commonly used in supporting the roof decks in factories and warehouses and also floor decks and in similar situations.

Bar-joists as they are known today are subject to the objection that they have very low resistance to twisting forces. In other words, they have a very poor torsional rigidity.

It is therefore the principal object of the present invention to provide a structural member which can be used in any situation in which a bar-joist can be used which will have all the advantages of the presently known bar-joist but which additionally will have uses in situations in which a bar-joist cannot presently be used, as for example, where columnar strength is required. It is a further object of the invention to provide such a structural member which will have even greater strength and load bearing capacity than the conventional bar-joist.

These and other objects of the invention which will be described in greater detail hereinafter or which will become apparent to one skilled in the art upon reading these specifications, I accomplish by that certain construction and arrangement of parts of which I shall now describe an exemplary embodiment.

Reference is made to the drawing forming a part hereof and in which:

FIGURE 1 is a fragmentary perspective view of a structural element according to the present invention;

FIGURE 2 is a cross-sectional view taken on the line 2—2 of FIGURE 1 on an enlarged scale;

FIGURE 3 is a diagrammatic fragmentary view of an element of the zig zag member, useful in understanding the principles of the invention; and FIGURES 3X, 3Y, and 3Z are cross-sectional views of the zig zag member taken on the lines 3X—3X, 3Y—3Y, and 3Z—3Z, respectively, of FIGURE 3.

Briefly, in the practice of the invention, I provide a structural element composed of three members, i.e. a pair of parallel chord members or flanges, connected by a web of strut members. The chord members or flanges may comprise channel members each of which has a web and edge flanges and these channel members may be disposed in spaced parallel mutually opposed relation so that the webs of the channels are in parallel planes and the edge flanges of the channels extend toward each other. The channel members may be secured together in the above described relationship by a zig zag member extending back and forth between the webs of the channels and welded thereto. The zig zag member mentioned above may be constituted of a continuous angle member formed as will be described in more detail hereinafter.

While the form of the parallel chord members or flanges may be varied considerably, as well as the form of the strut or connecting members, I prefer the form hereinafter described in detail.

Referring now in more detail to the drawing, an upper channel member is indicated generally at 10 and a lower channel member is indicated generally at 11. The channel member 10 has the web 10a and the edge flanges 10b and 10c.

The channel member 11 has a web portion 11a and the edge flanges 11b and 11c.

The zig zag member is indicated generally at 12. This member, as can be clearly seen in the figures, is an angle member having the two limbs 12a and 12b which extend substantially at a dihedral angle of 90°.

For attachment to the webs 10a and 11a of the channel members 10 and 11, the member 12 is provided with a series of spaced flat areas 13 which are in contact with the webs 10a and 11a and are welded thereto as will be described hereinafter. The flattening of the member 12 and the bending of the various angles is performed such that the edges of the flat areas, as indicated by the broken lines A—A and B—B, lie in a plane which constitutes the plane of the center of gravity of a straight portion of the angle member 12. As perhaps best seen in FIGURE 2, it will be observed that the line of bend A—A is substantially normal to a plane bisecting the dihedral angle of the angle member and which constitutes the center of gravity of the angle formed by the limbs 12a and 12b.

In a column, the limberness is determined by the ratio of its length to its least radius of gyration. The radius of gyration ($r$) of a section or shape is the normal distance from a neutral axis to the center of gyration. The center of gyration is the point at which the entire area of the section or shape is considered to be concentrated, and to have the same moment of inertia (I) as the actual area. The radius of gyration ($r$) of a section, referred to as a neutral axis, is the square root of the quotient obtained by dividing the moment of inertia (I) about that axis by the area (A), i.e. $r=\sqrt{I/A}$.

The unbraced length ($l$) of the section in compression divided by the least radius of gyration is known as its "slenderness ratio" or limberness ($l/r$) and it is the slenderness ratio or limberness which determines the safe compression load a section will sustain.

Each element of the member 12, between the channels 10 and 11, actually constitutes a column. If these individual struts are angle irons as described herein, it will be clear that the limberness and conversely the stiffness of such column will change in that portion thereof which is deformed adjacent its ends. Considering the strut as a whole, the length is the length of the strut $l$ (FIGURE 3), and the radius of gyration is the least radius of gyration taken at its center (FIGURE 3X). Considering a point in the deformed region of the strut near one end (FIGURE 3Y), the radius of gyration is taken at that particular point, and the length involved is twice the distance $l'$ of that particular point from the end of the strut. Therefore, care must be observed that the ratio of length to radius of gyration at any point in the deformed area (e.g. 3Y—3Y) shall not exceed this ratio taken in an undeformed portion of the strut (e.g. 3X—3X).

In securing the member 12 to the webs 10a and 11a, I prefer to accomplish this by what is known as projection welding. Accordingly, I provide at each line of bend A—A and B—B the projections 14, such that when the projections 14 are placed into contact with the web 10a, for example, an electric current is passed from the member 12 into the member 10. This current is concentrated in the four projections 14 which, in effect, spot weld the flat area 13 to the web 10a at four points. These four points are then, of course, so disposed that two of them lie as nearly as possible in the plane of the center of gravity of each of the adjacent straight portions of the member 12. Although projection welding is preferred, other means of attachment may of course be used so long as the above criteria are observed.

It will be understood that the structure described in connection with the upper connection in FIGURE 1, is of course repeated in the lower right-hand portion of the figure and at every other contact between the members 12 and 10 or 11.

The resultant structure is extremely strong because the forces transmitted through the straight portions of the member 12 are transmitted at the points 14 which lie at the center of gravity of the respective portions of the member 12. The resultant structural element is remarkably resistant to twisting forces and can therefore be used in situations where a conventional bar-joist could not be used.

It will be clear that numerous modifications may be made without departing from the spirit of the invention and I, therefore, do not intend to limit myself otherwise than as set forth in the claims which follow.

Having now fully described the invention, what I claim as new and desire to secure by Letters Patent is:

1. A metallic structural element, composed of a pair of chord members in parallel spaced relation, said chord members being secured together in said relation by a continuous web member, said web member extending in zig zag manner between said chord members, said web member being provided with flat areas where it contacts the respective chord members, the transverse edges of said flat areas lying respectively substantially in the planes of the centers of gravity of the portions of said web member extending between said chord members, said web member being secured to the respective chord members by welds at said edges, at least, of said flat areas.

2. A metallic structural element, composed of a pair of channel members in parallel spaced relation, said channel members having webs and being secured together in said relation by a continuous angle member, said angle member extending in zig zag manner between the webs of said channel members, said angle member being provided with flat areas where it contacts the respective channel member webs, the transverse edges of said flat areas lying respectively substantially in the planes of the centers of gravity of the portions of said angle member extending between said channel member webs, said angle member being secured to the respective channel member webs by welds at said edges, at least, of said flat areas.

3. A metallic structural element, composed of a pair of channel members and a continuous angle member, said angle member having at spaced intervals longitudinally thereof substantially flat areas, said flat areas being in a plane substantially normal to a plane bisecting said angle member and coinciding substantially with the plane of the center of gravity of said angle member, said angle member having a bend transverse thereof at each edge of said flat areas such that alternate ones of said flat areas lie in two spaced parallel planes, said channel members being respectively in contact with alternate ones of said flat areas and secured thereto by welds at said edges, at least, of said flat areas, whereby said channel members are secured in parallel spaced relation.

4. A structure according to claim 2, wherein there is a gradual deformation of the angle member adjacent each bend, and wherein the ratio of length to the least radius of gyration at any point in the deformed region does not exceed the ratio of length to the least radius of gyration in the undeformed region of the angle member.

References Cited in the file of this patent
UNITED STATES PATENTS

| | | |
|---|---|---|
| 1,865,059 | Ragsdale | June 28, 1932 |
| 2,068,052 | Coddington | Jan. 19, 1937 |